United States Patent

[11] 3,613,544

| [72] | Inventors | Hanns Plihal;<br>Gerhard Rothy; Josef Schild, all of Vienna, Austria |
|---|---|---|
| [21] | Appl. No. | 49,233 |
| [22] | Filed | June 24, 1970 |
| [45] | Patented | Oct. 19, 1971 |
| [73] | Assignees | Karl Vockenhuber<br>Vienna, Austria;<br>Raimund Hauser<br>Vienna, Austria |
| [32] | Priority | June 27, 1969 |
| [33] | | Austria |
| [31] | | A6194/69 |

[54] OPTICAL SYSTEM
32 Claims, 10 Drawing Figs.

[52] U.S. Cl. .................................................. 95/45, 350/187
[51] Int. Cl. ...................................................... G03b 3/00, G02b 15/00
[50] Field of Search ............................................ 95/45; 350/187, 186

[56] References Cited
UNITED STATES PATENTS

| 3,095,750 | 7/1963 | Mahn .......................... | 95/45 X |
| 3,095,794 | 7/1963 | Raab .......................... | 95/45 |
| 3,246,590 | 4/1966 | Jenkins........................ | 95/45 |
| 3,465,662 | 9/1969 | Kashiwase ................... | 95/45 |

*Primary Examiner*—Samuel S. Matthews
*Assistant Examiner*—Richard A. Wintercorn
*Attorney*—Ernest G. Montague

ABSTRACT: A focusing arrangement for a lens system. Two mutually independent focusing mechanisms, one of which is associated with a normal range and the other a macrophotographic range are cooperatively connected to an adjusting device for at least one optical element. The optical system has substantially different optical responses to the operation of the normal and macrophotographic range focusing mechanisms.

PATENTED OCT 19 1971 3,613,544

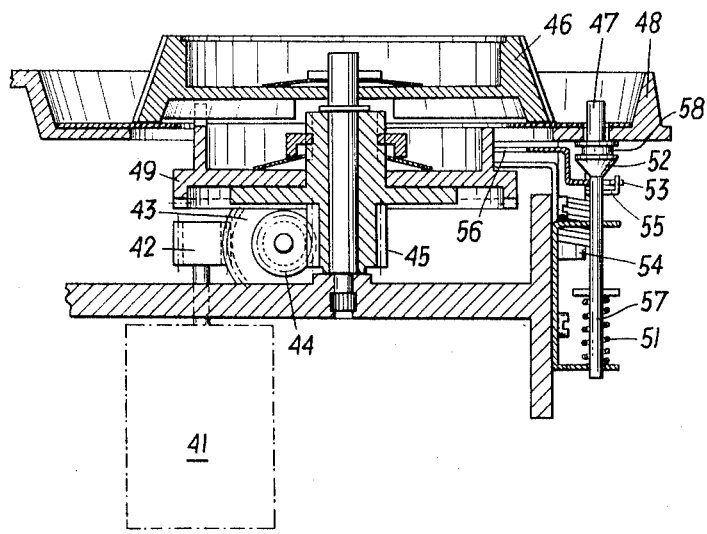
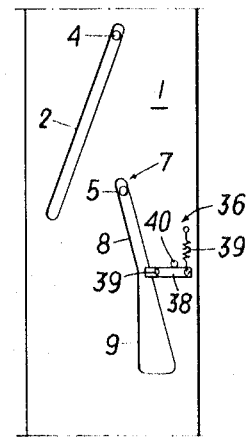
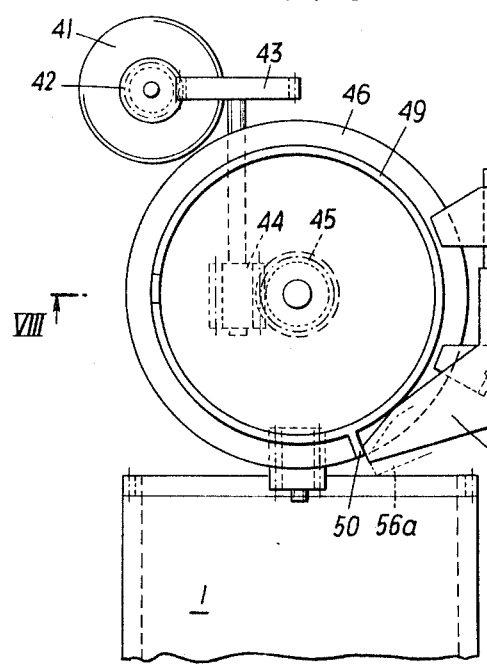
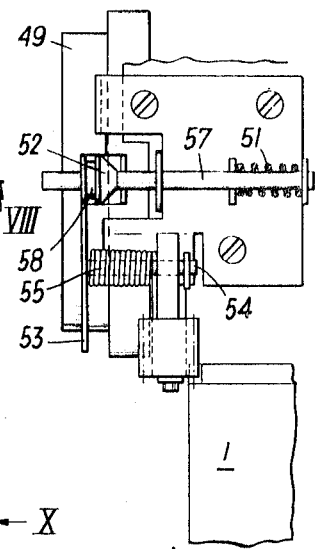

OPTICAL SYSTEM

This invention relates to an optical system, particularly to a camera lens, which comprises two mutually independent focusing mechanisms, one of which is associated with a larger distance and the other with a shorter distance, and which cooperate with the means for adjusting at least one optical element. An optical system of that kind has been disclosed in the Australian Pat. No. 265,695 which describes a system for focusing the system for a range from a near point to infinity. It is an object of this invention to apply the known principle to the focusing for distances in the macrophotographic range and the invention resides substantially in that the two focusing mechanisms differ greatly in their optical effects, one focusing mechanism being associated with the normal range of the optical system and the other focusing mechanism being associated with the macrophotographic range.

This results in the surprising advantage that the system can be prefocused for certain distances. For instance, the focusing mechanism associated with the normal range may be used to prefocus the system for a certain distance, which corresponds to the distance from an object which is to be photographed. By means of the focusing mechanism which is associated with the macrophotographic range, the adjustable optical element is set to a near object, such as a title. When the near object has been photographed, the focusing mechanism associated with the macrophotographic range may then be returned to its initial position so that the system is focused for the distance which has been preset by the focusing mechanism associated with the normal range. A dissolving effect can thus be obtained. Just as in the known system, the focusing mechanism associated with the normal range may be coupled to the focusing mechanisms so that a sliding fixed-focus setting would be obtained. In a preferred embodiment of the invention relating to a zoom system, the focusing mechanism associated with the macrophotographic range maybe adjusted in dependence on the position of the zooming means and at least one focusing mechanism is motor operable. In this case, the zooming means are adjustable to an end point, from which the focusing mechanism associated with the macrophotographic range must become effective. It will be desirable in that case that the focusing mechanism associated with the macrophotographic range is operable by the zooming means itself because only one means or the other can be operated at one time.

In a preferred embodiment of the invention relating to a system comprising separate cam sections in the focusing mechanisms and the zooming means, respectively, both cam sections may be combined in a single cam, particularly in a positively acting cam, in an arrangement in which the focusing cam section adjoins the zooming cam section, preferably that portion of the latter cam section which corresponds to a wide-angle setting of the optical system. IF a fixed focal length of the optical system is associated with the macrophotographic range, the focusing for short distances will be facilitated because the image remains stationary during the focusing operation. In zoom-type optical systems having a cam follower which is positively controlled by the zooming cam section, a space-saving arrangement will be obtained if the zooming cam section in the form of a slot or groove has at least in a part of its length an enlarged portion to enable a lifting of the cam follower, the width of said enlarged portion corresponds to the maximum lift which can be imparted to the cam follower by the focus-setting cam, and the enlarged portion suitably merges at an obtuse angle into a constricted portion of the zooming cam section. In this case, cam tubes of known kind may be used, and if the enlarged cam portion merges at an obtuse angle into the constricted portion of the zooming cam section, a change from a near range position to a position corresponding to a focusing for a an distance is enabled by an adjustment of the zooming cam section. Obviously the focusing cam section could also be carried by a control tube. In a preferred embodiment of the invention, the focusing cam section is rotatable or slidable in a plane which is parallel to the optical axis of the lens and acts directly on the cam follower. In this case, the focusing cam section may be mounted in a preferred embodiment of the invention on a support, such as a disc, which support at least partly protrudes from the housing.

For prefocusing, it is within the scope of the invention to provide locking means for holding the focusing cam section in position, and to enable the locking means, which may consist of a friction brake, to be released by a cam follower which returns from the enlarged portion or by a portion which is connected to the cam follower, whereafter the focusing cam section returns to its initial position. As a result, the focusing cam section will always return to its initial position when it has been used. In order to provide nevertheless for an indication of the fact that the focusing cam section is out of its initial position, said cam section is suitably connected to indicating means, which are preferably visible in the viewfinder of the camera and give an indication when the focusing cam section has been moved out of its initial position.

In order to prevent during a zooming operation an unintentional movement of the cam follower to positions adjacent to that portion of the focusing cam section which is associated with the macrophotographic range, a releasable locking device provided in a preferred embodiment of the invention prevents a movement of the cam follower to positions adjacent to the focusing cam section, and said releasable locking means preferably permits of a displacement of the adjusting member in the opposite direction. These locking means may be designed so that they must be released and the focusing mechanism must be operated when the system is to be focused for a short distance at the same time. The locking means are preferably releasable by a pushbutton or the like and are held in their released position by a detent device, which is releasable by the cam follower as it returns from positions adjacent to the near range portion of the focusing cam or by a member which is connected to said cam follower. In this case, the user of the lens will not have to perform two operations at the same time.

Further advantages and feature of the invention will become apparent from the following description of embodiments shown by way of example in the drawing.

FIG. 7 shows diagrammatically locking means applied to a tube as shown in FIG. 2.

FIGS. 8 to 10 show another embodiment of locking means, FIG. 8 being a sectional view taken on line VIII—VIII of Fig. 9 and FIG. 10 being an elevation taken from line X—X in FIG. 9.

Figure 2:
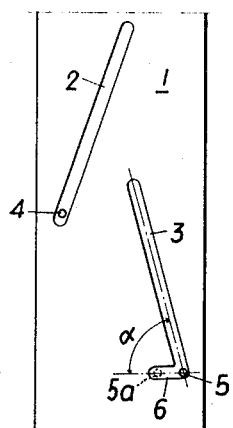
FIGS. 1 to 4 show four embodiments of mechanisms according to the invention comprising a pin and cam slot in a lens tube, which is shown developed.

A tube 1 is formed with slots 2, 3 for guiding setting members 4, 5 for adjusting two inner elements of a pancratic lens. During an adjustment of the tube, the setting member 5 associated with one of said inner elements slides along the cam slot 3 and the resulting movement of said inner element will cause the system to be focused for a short distance. For this purpose, the slot 3 is provided with an enlarged portion 6, which enables a movement of the setting member 5 to a position 5a which corresponds to a focusing for a short distance. This arrangement, however, does not enable a change from a position in which the system is focused for a short distance directly to a telephoto position but the setting member 5 must be moved from the enlarged portion 6 into the slot 3 before zooming is possible. This is due to the fact that the enlarged portion 6 opens at an acute angle$\alpha$ into the slot 3.

To enable a zooming directly from a position in which the system is focused for a short distance, a slot 7 having a constricted portion 8 and an enlarged portion 9 is provided (FIG. 2). Theoretically, the enlarged portion 9 could extend throughout the length of the slot 7, This is not possible in the embodiment shown by way of example because the slots 2 and 7 are too closely spaced. In FIG. 2, the enlarged portion 9 opens are to closely spaced. In FIG. 2, the enlarged portion 9 opens at an obtuse angle β into the constricted portion of the slot 7 so that a cam, not shown, which belongs to a near range focusing mechanism may be used to move the setting member 5 to a position 5b so as to prefocus the system for a short distance, whereafter zooming is possible even if the near range focusing cam has not returned to its initial position. In this zooming operation, the setting member 5 is moved from position 5b along the dash-dot line 10 to position 5c and then into the constricted portion 8 of the slot 7.

Figure 1:
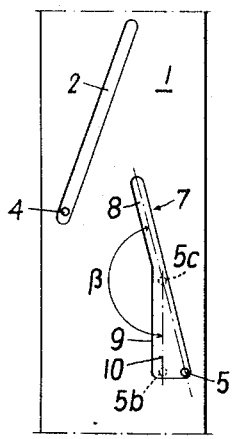
Figure 3:
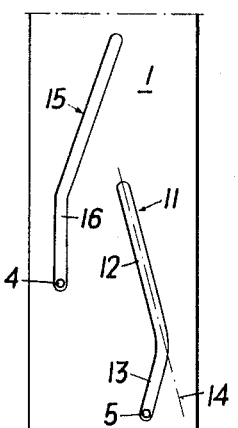
Figure 4:
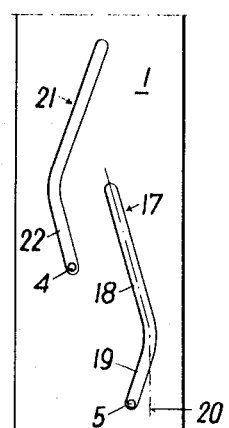

IN the embodiment shown in FIGS. 3 and 4, the setting member 5 is positively guided in a slot 11. The latter has a portion 12 in which the member 5 is guided for a zooming operation whereas the lens is focused for a predetermined distance, such as infinity. In another portion 13 of the slot 11, the setting member 5 is lifted, just as in the embodiments of FIGS. 1 and 2, from the imaginary cam path indicated by the dash-dot line 14 and moved to a position in which the lens is focused for a short distance. Hence, the portion 13 of the cam 11 corresponds to a near range focusing cam. The slot 15 for controlling the second inner element has a portion 16 (FIG. 3) that corresponds to the portion 13 of the slot 11 and holds the setting member 4 associated with the second inner element stationary as the lens is focused for a short distance so that there is no zooming. This fact facilitates the focusing for a short distance.

In FIG. 4, that portion 22 of the slot 21 which corresponds to the portion 16 is curved so that a further change in focal length, particularly a reduction thereof, is effected during the focusing of the lens for a short distance. In this operation, the setting member 5 associated with one inner element is lifted by the cam face 19 of the slot 17 from the imaginary continuation 20 of the portion 18 of the slot 17.

Figure 5:
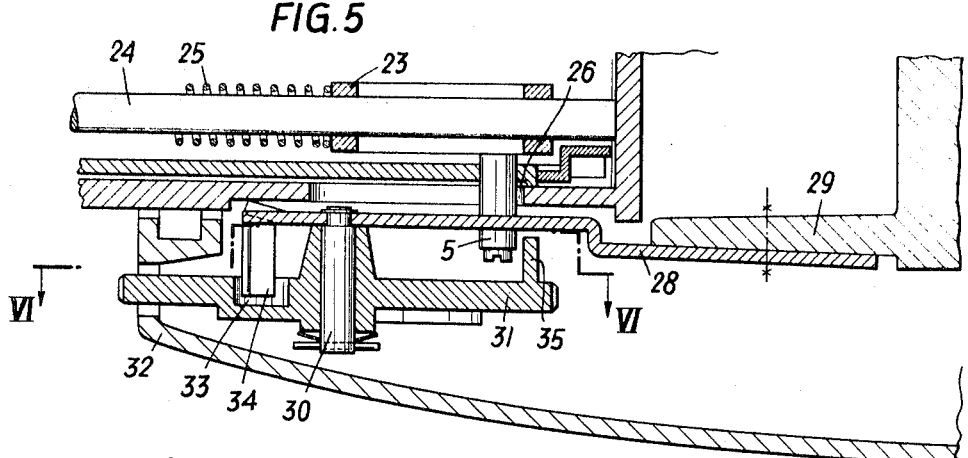
FIGS. 5 and 6 show a near range focusing mechanism according to the invention, FIG. 5 being a sectional view taken on line V—V in FIG. 6 and FIG. 6 being a sectional view taken on line VI—VI in FIG. 5.
Figure 6:
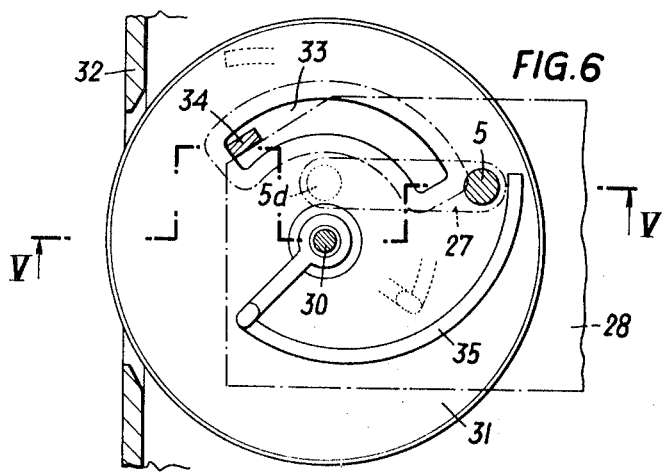

In the embodiment shown in FIGS. 5 and 6, the mount 23 of an inner element is guided along a column 24. The mount 23 is provided with a setting member 5, which is urged by a compression spring 25 against a cam 26. The setting member 5 extends through a slot 27 of a carrier 28, which is connected to a housing wall 29 of a camera. A disc 31 of a near range focusing mechanism is rotatably mounted on an axle 30, which is carried by the carrier 28. The disc 31 has a milled rim and partly protrudes from a housing wall 32 so that the disc can be rotated by hand. To limit the rotation of the disc 31, the latter is provided with a troughlike recess 33 whereas the carrier 28 is provided with a laterally bent lug 34, which enters the recess 33. A cam 35 is connected to the disc 31 and the disc 31 can be rotated to engage the cam 35 with the setting member 4. By a continued rotation of the disc 31, the setting member 5 is disengaged from the zooming cam 26 and against the action of the compression spring 25 is moved along the slot 17 in the carrier 28; this movement may be continued as far as to position 5d (FIG. 6). The cam 26 may be designed like the slot 3, 6 of FIG. 1 or like the slot 7 of FIG. 2.

The disc 31 can suitably be locked in position, e.g. by a friction brake, which is not shown. The arrangement is such that the locking means are released as the setting member 5 is moved back to position 5c (FIG. 2) and further into the portion 8 of the slot 7. To release locking means consisting of a friction brake, the same way be lifted from the disc 31 so that a return spring, not shown, causes the disc to return to its initial position shown in FIG. 6. In this arrangement it is ensured that the near range focusing mechanism is ready for a new focusing for a short distance when a title has been shot by means of a titler and the lens has been focused for a remote scene. There is preferably an indicating device which indicates that the disc 31 has been moved from its initial position shown in FIG. 6.

FIG. 7 shows a tube which has a cam slot such a is shown in FIG. 2. The arrangement shown in FIG. 7 comprises a one-way locking device 36, which prevents during a zooming operation an unintended movement of the setting member 5 into that portion 9 of the slot 7 which is adjacent to the near range focusing mechanism. If the near range focusing mechanism is adjusted so that the setting member 5 assumes the position 5b (FIG. 2) in the enlarged portion 9 of the slot 7, a zooming operation whereby the member 5 is moved from the constricted portion 8 of the slot 7 into the enlarged portion 9 would automatically focus the lens for a shorter distance. To ensure that this cannot be effected unintendedly, Locking means 36 are provided, which in accordance with FIG. 7 comprise a lever 38 which is pivoted on a pivot 37 and by a spring 39 is urged against a stop 40. Hence, the setting member 5 can move only in the constricted portion 8 of the slot 7.

If the lever 38 is pivotally moved in the clockwise sense about the pivot 37 by means which are not shown, the path for the movement of the setting member 5 into the enlarged portion 9 is opened and the setting member can enter the enlarged portion 9. A manual operation of the lever 38 for a movement in the opposite direction is not required because the locking means 36 prevents a movement only in one direction. Hence, a zooming operation from a position in which the setting member 5 is in the enlarged portion 9 to focus the system to a short distance, to the telephoto position is possible without difficulty. It will also be possible, of course, to release the locking means 36 and to open the entire slot 7 so that the focal length of the lens can be shortened when the latter has been focused for infinity. In this case, the setting member 5 slides along the right-hand cam face defining the slot 7 and the near range focusing mechanism remains in its initial position (see FIG. 6). SUch locking device 36 will be particularly desirable if the movements of the setting members are positively controlled, for instance, as shown in FIGS. 3 and 4.

Whereas the locking means 36 must be held open during a movement of the setting member 5 from the constricted portion 8 of the slot 7 into the enlarged portion 9 thereof and the user of the lens must perform two actions at the same time, because he must hold the locking means in an open position and move the setting member, this is not required in the embodiment shown in FIGS. 8 to 10, where a motor 41 moving the lens elements is geared to a handwheel 46 by a worm 42, a worm wheel 43 and two helical gears 44, 45. The tube 1 which carries the cams may also be adjusted by hand by means of the handwheel 46. The arrangement is such that locking means which correspond to the locking means 36 may be released by a pushbutton 47, which extends through a housing wall 48 at any time, when the setting member 5 is disposed in the portion 8 of the slot 7 (see FIG. 7). The pushbutton 47 is then locked in the open position and is releasable by a portion which is geared to that inner lens element which is associated with the setting member 5; this portion consists of a stop 50 provided on a wheel 49.

THe pushbutton 47 is urged by a spring 51 to the position shown in FIG. 8. If the pushbutton is axially displaced against the action of that spring 51, a cone portion 52 of the pushbutton 47 engages a stop lever 53, which is pivoted on a pin 54 and which is urged by a coil spring 55 against the cone portion 52 of the pushbutton 47. In response to an operation of the pushbutton 47, the cone 52 imparts a pivotal movement to the stop lever 53 against the action of the spring 55 and the lever 53 then snaps into a locked position behind the cone 52.

THe stop lever 53 now holds the pushbutton 47 in position. The stop lever 53 comprises a lug 56 (see FIG. 9), which cooperates with the stop 50 of the wheel 49. When the pushbutton 47 is not released, the stop lever 53 engages that portion 57 of the pushbutton 47 which is smaller in diameter and the lug 56 protrudes into the path of the stop 50. Hence the wheel 49 can be adjusted only until the stop 50 engages the lug 56. This position is indicated in solid lines in FIG. 9 and corresponds to the normal position during a zooming operation, when the setting member 5 moves in the portion 8 of the slot 7. As the pushbutton 47 is depressed, the stop lever 53 assumes a position behind the cone 52 and in engagement with a portion 58 of the pushbutton 47, which portion is larger in diameter, and the lug 56 assumes the position which is indicated at 56a in dotted lines in FIG. 9. During a zooming operation in this position of the parts, the stop 50 engages the inclined edge of the lug 56 so that the latter is slightly moved in the counterclockwise sense when viewed as shown in FIG. 9. This pivotal movement causes the stop lever 53 to disengage the cone 52 of the pushbutton 47 so that the latter springs back to its original position (FIG. 8) under the action of the spring 51.

The invention may be modified in various ways. FOr instance, the pushbutton 47 may be disposed near the forward end of the lens and may be automatically operable by a titler which can be mounted on the lens. Besides, the title holder of a titler may be connected to the near range focusing mechanism in such a manner that the title is moved to a predetermined distance from the lens and the lens is focused for said distance at the same time. FOr this purpose, the holder could be connected, e.g. to a rack, which is adjustable by an actuating knob, which is connected to a pinion, which operates the near range focusing means at the same time. It is also desirable if the operation of the pushbutton 47 results in an indication that the locking means are open.

What is claimed is:

1. An optical system, which comprises
optically effective means movable to focus said optical system for different distances,
setting means connected to said optically effective means and operable to move the same so as to focus said optical system for distances within and outside a macrophotographic range,
a normal range focusing mechanism operatively connected to said setting means and operable to focus said optical system for distances outside said macrophotographic range, and
a near range focusing mechanism operatively connnected to said setting means and operable to focus said optical system for a distance within said macrophotographic range,
said focusing mechanisms being operable independently of each other,
said optical system having substantially different optical responses to the operation of said normal range and near range focusing mechanisms.

2. An optical system as set forth in claim 1, which constitutes a camera lens.

3. An optical system as set forth in claim 1, in which said optically effective means consist of one optically effective element.

4. An optical system as set forth in claim 1, which comprises zooming means operable to change the focal length of said system and in unison therewith to operate said near range-focusing mechanism,
means operable to move said near range focusing mechanism in dependence on the position of said zooming means, and
motor means operable to move at least one of said focusing mechanisms.

5. An optical system as set forth in claim 4, in which said near range focusing mechanism is operatively connected to said zooming means.

6. An optical system as set forth in claim 5, which comprises a first cam section forming part of said zooming means and a second cam section forming part of said near range focusing mechanism,
said first and second cam sections being formed by a single cam structure, in which said second cam section adjoins said first cam section,
a cam follower is operatively connected to said setting means and engageable with said first and second cam sections.

7. An optical system as set forth in claim 6, in which
said first cam section comprises a wide-angle portion arranged to be engaged by said cam follower when said optical system is in a position and
said second cam section adjoins said wide-angle portion.

8. An optical system as set forth in claim 6, in which said cam structure is positively engaged by said cam follower.

9. An optical system as set forth in claim 6, in which
said second cam section is engageable with said cam follower, and
means are provided for maintaining a fixed focal length of said optical system during a movement of said cam follower in engagement with said second cam section.

10. An optical system as set forth in claim 6, which comprises releasable locking means adapted to prevent a movement of said cam follower along said second cam section in a predetermined direction.

11. An optical system as set forth in claim 10, in which said locking means are adapted to prevent a movement of said cam follower along said second cam section only in said predetermined direction.

12. An optical system as set forth in claim 10, in which
said cam follower is movable to an initial position, in which it is disengaged from said second cam section, and which comprises
release means operable to move said locking means to a release position, and
detent means arranged to hold said locking means in said release position and to release said locking means in response to a movement of said cam follower from said second cam section to said initial position.

13. An optical system as set forth in claim 12, in which said release means comprise a pushbutton.

14. An optical system as set forth in claim 12, in which said cam follower is arranged directly to engage said detent means to cause it to release said locking means as said cam follower moves from said second cam section to said initial position.

15. An optical system as set forth in claim 12, which comprises a release member which is connected to said cam follower and arranged to engage said detent means to cause it to release said locking means as said cam follower moves from said second cam section to said initial position.

16. An optical system as set forth in claim 12, which constitutes a lens having a forward end portion and adapted to carry a titler, said release means being mounted on said forward end portion and adapted to be operated by a titler as the latter is applied to said lens.

17. An optical system as set forth in claim 12, which comprises indicating means adapted to indicate that said locking means is in a released condition.

18. An optical system as set forth in claim 17, which is incorporated in a camera having a viewfinder in which said indicating means are visible in said condition.

19. An optical system as set forth in claim 1, in which
a zooming cam is provided, which is formed with a zooming cam face defining a zooming cam slot,
said focusing mechanisms comprise a focusing cam,
a cam follower is connected to said setting means and adapted to be positively engaged with said zooming cam face and said focusing cam,
said focusing cam is operable to disengage said cam follower from said zooming cam face to a predetermined maximum lift,
said zooming cam is operable to change the focal length of said optical system, and
said zooming cam slot has an enlarged portion, which permits of a disengagement of said cam follower from said zooming cam face to said maximum lift.

20. An optical system as set forth in claim 19, in which
said zooming cam slot has a constricted portion and
said enlarged portion opens at an obtuse angle into said constricted portion.

21. An optical system as set forth in claim 19, in which said zooming cam slot consists of a groove.

22. An optical system as set forth in claim 19, in which
said optical system defines an optical axis,
said focusing cam to movable in said plane, and
said cam follower is rigid with said setting means.

23. An optical system as set forth in claim 22, in which said focusing cam is rotatable in said plane.

24. An optical system as set forth in claim 22, in which said focusing cam is displaceable in said plane.

25. An optical system as set forth in claim 22, which comprises
a housing and
a support carrying said focusing cam and at least partly protruding from said housing.

26. An optical system as set forth in claim 25, in which said support consists of a disc.

27. An optical system as set forth in claim 19, in which
said zooming cam slot comprises a constricted portion,
locking means for locking said focusing cam in position are arranged to be released in response to a movement of said constricted portion, and
a return spring is operatively connected to said focusing cam and tends to return the same to a predetermined initial position.

28. An optical system as set forth in claim 27, in which said locking means comprise a friction brake.

29. An optical system as set forth in claim 27, in which
said cam follower is arranged directly to engage said locking means to release the same as said cam follower moves from said enlarged portion to said constricted portion.

30. An optical system as set forth in claim 27, which comprises a release member, which is connected to said cam follower and arranged to engage said locking means to release the same as said cam follower moves from said enlarged portion to said constricted portion.

31. An optical system as set forth in claim 19, which comprises indicating means connected to said focusing cam and arranged to indicate a condition in which said focusing cam is out of a predetermined initial position.

32. An optical system as set forth in claim 31, which is incorporated in a camera having a viewfinder in which said indicating means are visible in said condition.

Disclaimer 3,613,544.—*Hanns Plihal, Gerhard Rothy*, and *Josef Schild*, Vienna, Austria. OPTICAL SYSTEM. Patent dated Oct. 19, 1971. Disclaimer filed Oct. 1, 1973, by the assignees *Karl Vockenhuber and Raimund Hauser*.
Hereby enter this disclaimer to claims 1, 2 and 3 of said patent.
[*Official Gazette February 5, 1974*]